United States Patent Office 2,914,487
Patented Nov. 24, 1959

2,914,487

BONDING OF ADSORBENT MATERIALS

John E. Hoffman, Brentwood, Mo., assignor to Sporlan Valve Company, Inc., St. Louis, Mo., a corporation of Missouri No Drawing. Application June 15, 1955
Serial No. 515,766

5 Claims. (Cl. 252—455)

This invention relates generally to the bonding of adsorbent materials, and more particularly relates to novel compositions of matter, to methods of manufacturing such compositions, and to certain products which may be made from the compositions.

The desirability of bonding adsorbents for filtering and drying purposes has heretofore been appreciated since it avoids the objections to adsorbents in unconsolidated form. It will be apparent that adsorbents in unconsolidated form tend to develop channels, that attrition between the individual granules occurs, and that classification of the granules and stratification of the adsorbent bed takes place.

There have been various proposals for bonding adsorbent particles, some of which have contemplated the use of sodium silicate to form the bonding medium. However, bonding of discrete particles of adsorbent materials presents a serious problem in that the bonding medium must not close the pore openings of the adsorbent. The principal objective of this invention is the development of means for solving this problem, thus enabling the consolidation of the particles of adsorbent material into unitary masses, such as molded blocks, without detriment to the micro-structure.

Another important objective of this invention is to provide a new composition of matter capable of various uses. While the material may find application in various industrial fields, it is especially effective as a filter and desiccant for the physical and chemical removal of undesirable substances from fluids.

Still another important object is realized by the development of an economical process of manufacturing such material.

Another object is realized by the provision of means which affords a bond of excellent strength that does not interfere with the micro-cellular porosity of the adsorbent material on which the adsorbent properties of such material depend.

It is an important objective to provide a filter block that may be readily utilized in refrigeration systems to remove foreign matter, moisture, oil contamination, sludge and acid from the refrigerant and refrigerant oil. Such filter blocks made up in accordance with this invention stand up remarkably well under severe operating conditions, are very resistant to breakage, and do not present any substantial resistance to the fluid flow therethrough.

To accomplish the above mentioned objects and others which will hereinafter more fully appear, the invention in general embraces the concept of effectively bonding discrete particles of an adsorbent material in such a manner that the adsorptive efficiency of such particles is not appreciably impaired. Specifically, the finished product consists of particles of an adsorbent material bonded together to provide a single unit in which the material and bonding medium provide a multiplicity of cells affording a large surface area. The adsorbent materials, which may be previously activated or be of a type which may be rendered adsorbent subsequently to bonding, is bonded by the use of sodium silicate and calcium aluminate or the reaction product of said materials. Any suitable adsorbent material such as alumina, silica gel calcium sulphate, fuller's earth, etc., may be used, and these materials may be either activated, partially activated or unactivated at the time the particles are bonded.

In the preferred method of manufacturing a filter block, the calcium aluminate is mixed with a sodium silicate solution to realize a bonding medium, and then the bonding medium is mixed with an adsorbent material such as alumina until a tacky mass is formed. Then the tacky mass is molded under pressure to the desired shape, and the shaped product is baked at a temperature and for a period to dehydrate and activate the adsorbent material. The bonding medium realizes a molded product that exhibits an excellent wet strength.

Extensive reasearch and experimental work indicates that the molded filter and desiccant structure has good strength when the bonding medium consists of 50% or less calcium aluminate. The above percentage is based on dry calcium aluminate by weight and sodium silicate solution by weight. It appears that the maximum strength is obtained when approximately 10 to 13½% calcium aluminate is used. Preferably, calcium trialuminate ($CaO.3Al_2O_3$) and Seal Brand sodium silicate solution is used to make the bonding medium. However, sufficient research has been conducted to show that calcium monoaluminate ($CaO.Al_2O_3$) works as well as calcium trialuminate, and that other sodium silicate solutions of the proper viscosity may be used.

Research has also disclosed that the bonding medium may consist of sodium silicate solution and Lumnite cement which is a well known material sold by the Universal Atlas Cement Company of New York, N.Y., and which consists of an impure form of calcium aluminate made from bauxite. It is about 80% calcium aluminate and the remainder is impurities consisting mainly of iron oxide and silica. The composition of this Lumnite cement is 37.9% CaO; 41.3% $Al_2O_3$; 9.7% $SiO_2$; 0.82% MgO; 4.5% FeO; 5.0% $Fe_2O_3$, and 0.22% $SO_3$. Obviously, the Lumnite cement consists of essentially all calcium monoaluminate. For the sake of economy, it may be desirous to use this impure form of calcium aluminate since essentially the same results are obtained.

The strength of the molded filter and desiccant structure varies considerably with the percentage of bonding medium used. Increasing the percentage of bonding medium from 10% to 20% affords over a three-fold increase in impact strength. However, since increasing the binder also has the effect of decreasing the amount of effective desiccant, the water adsorption capacity of the structure decreases as the percentage of bonding medium is increased. It is believed that 17% bonding medium is sufficient to give excellent strength without decreasing the adsorptive capacity to any substantial extent.

To illustrate the principle of the invention, a specific example is now described. The bonding medium is first prepared by mixing 11% dry calcium aluminate by weight with 89% sodium silicate solution by weight. Then the bonding medium is mixed with alumina on the basis of 17% bonding medium to 83% alumina. This tacky mass is molded under pressure for several minutes into cylinders of desiccant 1⅝" in diameter and 2¼" long, and then the molded product is fired for four hours at 600° to 900° F. These cylindrical filter blocks were found to have an impact strength of 1.75 foot-pounds, and to have a static water adsorption of 3.0% at 20% relative humidity. Of course, it is understood that the precise ingredients mentioned above, their respective amounts, the sequence of steps, and temperatures and times set forth may be varied within relatively wide limits to meet certain conditions.

Without restriction to any theory, it is believed that the mixing of calcium aluminate with the sodium silicate solution results in the formation of complex calcium sodium alumina silicate which serves as the final bonding agent. This bonding medium provides great strength, and is believed porous as well as the adsorbent itself since there is no substantial loss of adsorptive efficiency of the bonded product over the unbonded material. Since the bonding medium has good strength qualities, it is possible to use less percentage of bonding medium and thereby mold more desiccant into the filter block.

Moreover, the bonding medium does not close the spaces between the particles of adsorbent material, and hence realizes a porous structure across which exists a low pressure drop when subjected to fluid flow therethrough. When sodium silicate is used by itself, it seals the spaces between the particles and does not form a porous structure. Tests indicate that blocks made with sodium silicate alone, and tested at various flow rates through the blocks, have about three times the pressure drop of the blocks prepared with calcium aluminate in the bonding medium. This is very important since the block acts as a filter and drier when used in refrigeration systems.

This bonding medium provides other advantageous results in that no undesirable materials or substances can be leached out of the molded, porous desiccant structure formed thereby when the structure is in use.

By "activated" and "unactivated" as appearing herein, the adsorptive activation or unactivation of the material in question is referred to, which as pointed out, may be either partial or complete. Furthermore, in the appended claims the expression "adsorbent material," in the absence of specific qualification, is to be construed as embracing either a material that is actually activated or a material that, while not actually activated, is capable of being activated.

While for purposes of clarity the foregoing specification sets forth certain specific materials, quantities, steps in the process, and uses of the product, it is of course obvious that various departures may be made therefrom without exceeding the bounds of the invention, and therefore the true scope of the invention is defined solely by the scope of the appended claims.

I claim as my invention:

1. Process of forming a molded, porous filter block which comprises mixing calcium aluminate with sodium silicate solution to provide a bonding medium in which there is no more than 50% by weight of calcium aluminate, the calcium aluminate being selected from a group consisting of essentially calcium monoaluminate, calcium trialuminate and Lumnite cement, further mixing about 10% to 20% bonding medium by weight with granular mineral adsorbent material until the entire mix forms a tacky mass, molding the tacky mass under pressure for several minutes into blocks, removing the blocks from the molds, and immediately firing the molded block at about 600 degrees to 900 degrees F.

2. Process of forming a molded, porous filter block which comprises mixing calcium aluminate with sodium silicate solution to provide a bonding medium in which there is no more than 50% by weight of calcium aluminate, the calcium aluminate being selected from a group consisting essentially of calcium monoaluminate, calcium trialuminate and Lumnite cement, further mixing about 17% bonding medium by weight with about 83% granular mineral adsorbent material by weight until the entire mix forms a tacky mass, molding the tacky mass under pressure for several minutes into blocks, removing the blocks from the mold, and then immediately baking the molded blocks at about 600 degrees to 900 degrees F.

3. Process of forming a molded, porous filter block which comprises mixing about 10% to 13½% calcium aluminate by weight with about 86½% to 90% sodium silicate solution by weight to provide a bonding medium, the calcium aluminate being selected from a group consisting of essentially calcium monoaluminate, calcium trialuminate and Lumnite cement, further mixing about 10% to 20% bonding medium by weight with about 80% to 90% granular mineral adsorbent material by weight until the entire mix forms a tacky mass, molding the tacky mass under pressure for several minutes into blocks, removing the blocks from the mold, and then immediately baking the molded block at about 600 to 900 degrees F.

4. Process of forming a molded, porous filter block which comprises mixing about 10% to 13½% calcium aluminate by weight with about 86½% to 90% sodium silicate solution by weight to provide a bonding medium, the calcium aluminate being selected from a group consisting of essentially calcium monoaluminate, calcium trialuminate and Lumnite cement, further mixing about 17% bonding medium by weight with about 83% granular mineral adsorbent material by weight until the entire mix forms a tacky mass, molding the tacky mass under pressure for several minutes into blocks, removing the blocks from the mold, and then immediately firing the molded blocks at about 600 degrees to 900 degrees F.

5. An article formed by the process set forth in claim 1.

References Cited in the file of this patent

UNITED STATES PATENTS

| | | |
|---|---|---|
| 1,029,954 | Spackman | June 18, 1912 |
| 1,657,753 | Jaeger et al. | Jan. 31, 1928 |
| 1,788,706 | Cross | Jan. 13, 1931 |
| 1,873,296 | Cross | Aug. 23, 1932 |
| 1,913,943 | Morgan | June 13, 1933 |
| 2,057,414 | Briggs et al. | Oct. 13, 1936 |
| 2,695,850 | Lorenz | Nov. 30, 1954 |

FOREIGN PATENTS

| | | |
|---|---|---|
| 369,308 | Italy | Mar. 16, 1939 |